United States Patent [19]

Langanke

[11] 4,317,014  
[45] Feb. 23, 1982

[54] GAS SPRING

[75] Inventor: Rolf Langanke, Boppard, Fed. Rep. of Germany

[73] Assignee: Stabilus GmbH, Koblenz-Neuendorf, Fed. Rep. of Germany

[21] Appl. No.: 140,453

[22] Filed: Apr. 17, 1980

[30] Foreign Application Priority Data

Apr. 28, 1979 [DE] Fed. Rep. of Germany ....... 2917390

[51] Int. Cl.³ .............................................. H01H 3/00
[52] U.S. Cl. .............................. 200/61.62; 200/82 D; 200/292; 339/17 F
[58] Field of Search ................ 200/61.62, 292, 82 D; 339/17 R, 117 P, 17 F; 174/68.5

[56] References Cited

U.S. PATENT DOCUMENTS

| 1,003,455 | 9/1911 | Hardwick | 200/84 R |
| 2,881,403 | 4/1959 | Vetavsky | 339/9 |
| 2,994,058 | 7/1961 | Dahlgren | 174/68.5 |
| 3,646,512 | 2/1972 | Borgstede | 340/52 |
| 3,649,786 | 3/1972 | Mauron | 200/61.53 |
| 3,812,312 | 5/1974 | Andersen et al. | 200/61.53 |
| 3,844,247 | 10/1974 | Collis et al. | 115/41 HT |
| 3,853,331 | 12/1974 | Jones | 280/150 AB |
| 3,919,509 | 11/1975 | Schnitzius | 200/61.62 |
| 4,163,970 | 8/1979 | Allinquant et al. | 340/686 |

FOREIGN PATENT DOCUMENTS

| 7304750 | 8/1973 | Fed. Rep. of Germany . |
| 2421007 | 11/1975 | Fed. Rep. of Germany . |
| 7610754 | 4/1976 | Fed. Rep. of Germany . |
| 7603281 | 3/1977 | Fed. Rep. of Germany . |
| 1210760 | 10/1970 | United Kingdom . |
| 1222293 | 2/1971 | United Kingdom . |
| 1304550 | 1/1973 | United Kingdom . |
| 1471387 | 4/1977 | United Kingdom . |

Primary Examiner—Gene Z. Rubinson  
Assistant Examiner—Morris Ginsburg  
Attorney, Agent, or Firm—Brumbaugh, Graves, Donohue & Raymond

[57] ABSTRACT

In the illustrative embodiments disclosed, one or more independent current paths are provided in a gas spring by use of printed circuit-type conductors. The printed conductor or conductors are preferably formed on a strip of insulating material using known printed circuit techniques, and the strip is then affixed to the cylinder member of the gas spring by an adhesive or, alternatively, by a heat-shrunken surrounding, plastic tube. A current path may be connected to provide a switch function or to establish a closed circuit over a substantial portion of or the entire stroke of the piston rod member. Where plural current paths are provided, the different paths can be given different functions.

21 Claims, 7 Drawing Figures

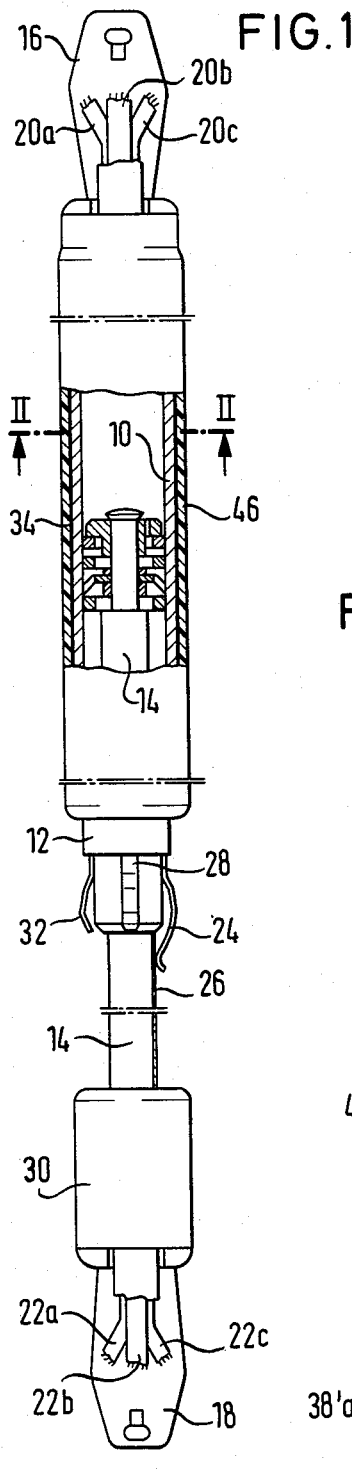
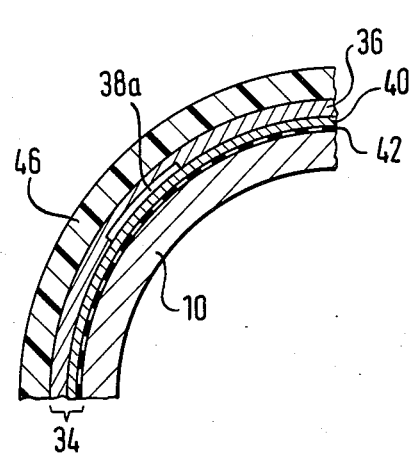
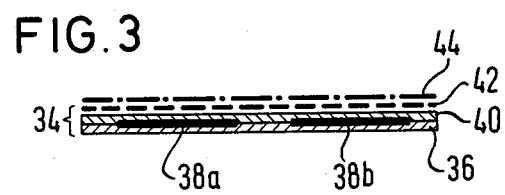
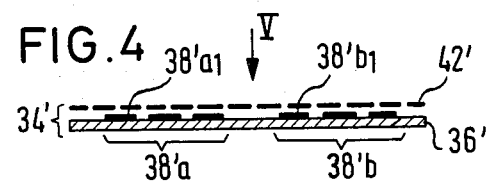
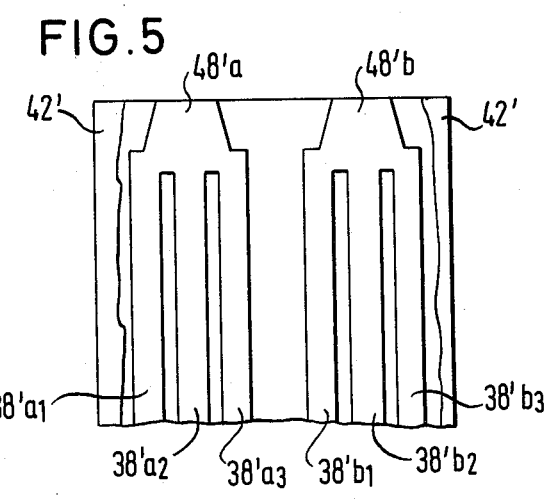

GAS SPRING

BACKGROUND

1. Field of the Invention

The present invention relates to a gas spring useful to conduct electric current between one or more pairs of electric terminals.

2. The Prior Art

Gas springs capable of conducting electric currents are known, as, for example, from U.S. Pat. No. 3,919,509 and German Gebrauchsmuster No. 76 10 754. Such electrically conducting gas springs are especially useful in motor cars, where they can be attached to the car construction on the one hand and a movable lid, for example a motor hood or a trunk lid, on the other hand, so as to compensate for at least part of the weight of the lid and facilitate opening and closing of the lid. Frequently on such a movable lid there is provided an electric power consuming unit, such as a rear light, a trunk lighting unit, a windshield wiper or a license plate illuminating unit. In this case, the electrically conducting gas springs can also be used to transmit electric power from a power source provided on the car construction to the power consuming units on the lid. The gas springs described in U.S. Pat. No. 3,919,509 and GM No. 76 10 754, however, incorporate only a single current path across the spring elements, thereby limiting the number of power consuming units that the spring can feed to one. Other prior art gas spring arrangements have provided plural, independent current paths. One such gas spring is disclosed in German Offenlegungsschrift No. 24 21 007. Such prior art, plural path devices, however, have tended to be relatively complex or bulky or both, all of which detract from their suitability.

SUMMARY

It is therefore an object of the invention to provide a gas spring of the electrically conductive type which is of simple and small construction, has an attractive appearance, and can be used if necessary for conducting electric power to a plurality of independent power consuming units.

This and other objects of the invention are attained by providing an electrically conductive gas spring which includes one or more conductors provided on the cylinder member and extending over at least part of the axial length thereof that are constituted by printed circuit elements.

Because the conductor or conductors are of the printed circuit type, the volume of the gas spring is not substantially increased even though a plurality of current paths are provided on the cylinder member. Moreover, the external cylindrical shape of the cylinder member remains essentially unchanged, as does the diameter of the cylinder member. The use of printed circuit techniques to provide the conductors permits the number of independent current paths to be readily increased without difficulty.

According to a preferred embodiment of the invention, the printed circuit conductor or conductors, as the case may be, are provided on a strip of insulating sheet material, the strip being applied to the outer exterior face of the cylinder member. The strip of insulating sheet material is preferably flexible, so that it can be shaped in conformity with the exterior surface of the cylinder member. In a very simple and economic embodiment of the invention, the strip of insulating sheet material bearing the printed conductor is a substantially rectangular strip, two edges of which extend parallel to the longitudinal axis of the cylinder member. The rectangular strip may extend around up to 360° of the circumference of the cylinder member. Alternatively, the strip could extend over more than 360°, so that the parallel edges of the strip overlap.

In order to isolate the printed conductor electrically from the cylinder member, which is frequently made of metallic material, it can be useful to fully insulate the printed conductor. This can be achieved by providing an insulating covering layer on the side of the strip that bears the printed conductor. Such an insulating covering layer can be provided by a covering film of, for example, plastic material, such as a polyester film.

The fixation of the strip to the exterior surface of the cylinder member can be accomplished by a layer of adhesive material. If so, the layer of adhesive material is preferably provided on the strip bearing the printed conductor, so that the manufacturer of the gas spring need not handle the adhesive material. Any suitable adhesive may be used. For instance, the adhesive may be of the type that can be reactivated by heating before applying the strip to the cylinder member. Preferably, however, the adhesive is a pressure sensitive adhesive, which can be bonded to the cylinder member by simply applying the strip to the cylinder member by pressure. In this case, the manufacturer of the strip bearing the printed conductor and the adhesive layer may provide a protective film or protective paper over the adhesive film, which protective film or paper need then only be removed to ready the strip for application to the cylinder member. In any event, however, the steps to be performed by the gas spring manufacturer when applying the strip by use of an adhesive are extremely simple and can be performed by unskilled people and without complicated machinery. In cases where the adhesive layer has sufficient insulating properties, it may also function to insulate the printed conductor from the cylinder member and the separate insulating covering layer need not be provided.

As another feature of the invention, the strip of insulating sheet material bearing the printed conductor may be covered by a tubular protection member surrounding the cylinder member. This tubular protection member may be under circumferential tension, e.g. by shrink fitting, so as to fix the strip of insulating sheet material in an elected position on the exterior face of the cylinder member. In this case, the adhesive bonding may be eliminated if desired.

As mentioned above, the strip is preferably flexible so as to be conformable to the exterior face of the cylinder member. On the other hand, if heavy currents are to be transmitted through the printed conductor, the printed conductor should have a considerable cross section and therefore a considerable thickness. As such considerable thickness might reduce the flexibility of the strip, which is undesirable, the printed conductor is instead preferably comprised of a plurality of printed conductive lines extending substantially parallel to each other and being interconnected adjacent the axial ends of the strip of insulating sheet material. Such interconnection can be accomplished by a conductive bridge, which can also be printed on the strip.

As stated, it is an object of the invention that the incorporation into a gas spring of a conductor or conductors neither increase the volume nor change the shape of the gas spring. This can be easily achieved by the use of the printed conductor construction of the present invention. Care should also be taken, however, that structure for connecting the printed conductor to the electrically conductive terminals carried by the gas spring likewise does not significantly, or at all, increase the spring volume or modify its cylindrical form. With this object in view it is a further feature of the invention that the connecting structure is provided inside a virtual cylinder face that is in axial alignment with the exterior face of the cylinder member or the exterior face of the radially outermost layer of material provided on the exterior face of the cylinder member. This can easily be accomplished in cases in which the cylinder member is provided with a terminal section of reduced diameter adjacent at least one of its axial ends by providing the electrical connecting structure adjacent the terminal section of reduced diameter.

The electrically conductive gas spring of the invention can be constructed to operate as a switch or to establish a closed circuit over all or a substantial portion of the stroke of the piston rod, or both. To provide a switch function, a first contact element is provided on the cylinder member adjacent the end wall thereof through which the piston rod extends and a second contact element is provided on an axially terminal portion of the piston rod member, the second contact element engaging the first contact element when the piston rod member approaches the inward terminal position relative to the cylinder. To provide a closed circuit over some or all of the piston rod stroke, a slide contact is provided on the cylinder member adjacent the end wall of the cylinder through which the piston rod extends and a sliding path of electrically conductive material is provided on the piston rod member, the sliding contact engaging the sliding path during part or all of the movement of the piston rod member relative to the cylinder member.

According to the invention, a plurality of current paths can readily be provided in a single gas spring. It is only necessary to provide a respective number of first and second electrically conductive terminals on the cylinder member and the piston rod member, respectively, and to connect each pair of first and second respective terminals by respective printed conductors.

While it is possible to rely only on the printed conductors for establishing a plurality of current paths across the gas spring, it is also possible, in accordance with the invention, to establish at least one additional current path by a different conductive means. Frequently, the cylinder member and the piston rod member are at least partially made of electrically conductive material. In this case, it is possible to provide at least one further first electrically conductive terminal and one further second electrically conductive terminal which are electrically connected via the cylinder member and the piston rod member during at least part of the movement of the piston rod member with respect to said cylinder member. Preferably this additional current path is used for the power supply of those electrical consuming units that are to be fed in all positions of the gas springs, e.g. in all positions of the lid, or at least over a wide range of positions of the piston rod member relative to the cylinder member. This is true, for example, for a trunk illumination unit. On the other hand, it may be of advantage to feed some types of electric power consuming units by current paths that are interrupted in one position or in a range of positions of the piston rod member with respect to the cylinder member. In this case, those current paths which are established by a printed conductor and a switch in series therewith may be used.

It will also be readily understood that the cylinder member need not necessarily be made of metallic material. For instance, it could be made of plastic material. In such case, it is possible to print the conductor directly on the cylinder member by known electric circuit printing techniques.

BRIEF DESCRIPTION OF THE DRAWINGS

Further objects and advantages of the invention will become apparent from the following detailed description of exemplary embodiments thereof, taken in conjunction with the accompanying drawings, in which:

FIG. 1 is a longitudinal view, partly in section, of one embodiment of a gas spring according to the invention;

FIG. 2 is a partial sectional view taken along the line II—II in FIG. 1 and looking in the direction of the arrows;

FIG. 3 is a sectional view of one arrangement of the conductive strip material of the invention;

FIG. 4 is a sectional view of another arrangement of the conductive strip material of the invention;

FIG. 5 is a partial plan view of the strip material of FIG. 4 taken in the direction of the arrow V, with part of the top layer broken away for clarity;

DETAILED DESCRIPTION

Figure 6:
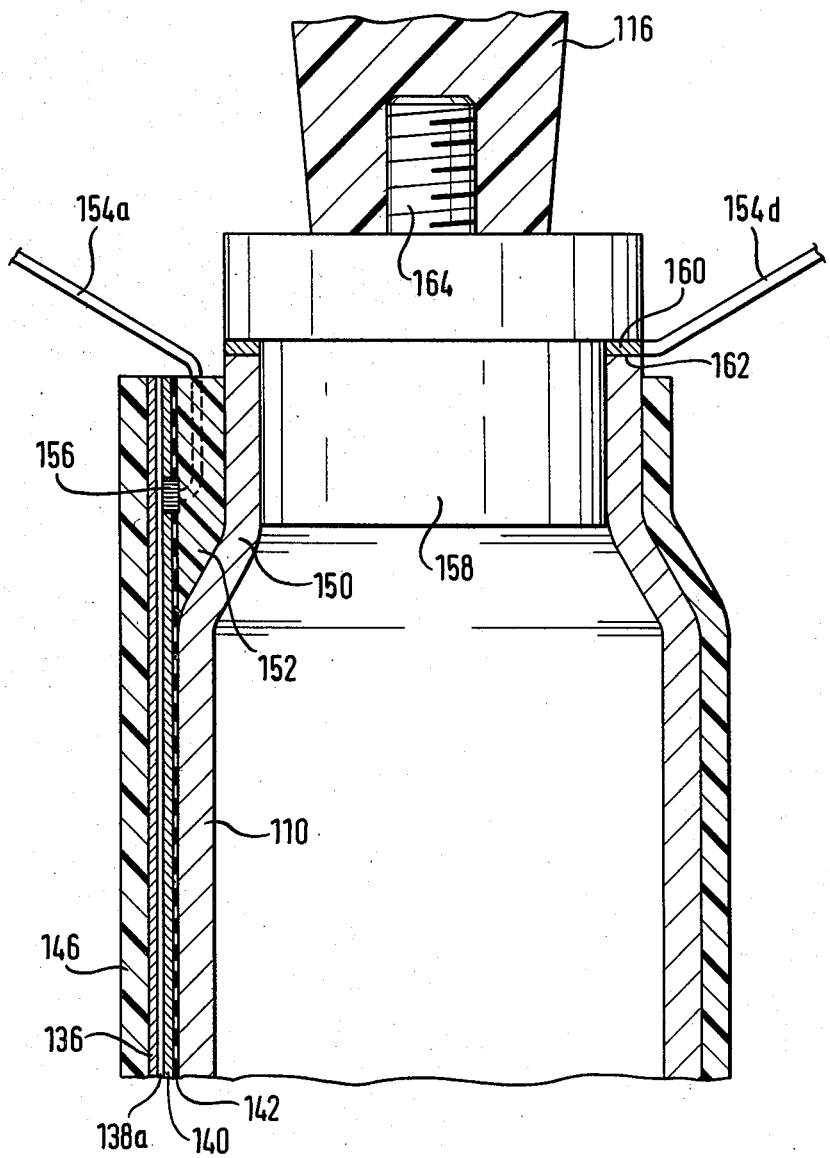
FIG. 6 is a partial longitudinal sectional view of the upper part (as seen in FIG. 1) of another embodiment of a gas spring according to the invention.

In the embodiment of FIG. 1, a cylinder 10 of a gas spring is closed at its upper end and is provided with a piston rod sealing and guiding unit 12 at its lower end. A piston rod member 14 extends through the piston rod sealing and guiding unit 12. A first fastening member 16 of insulating plastic material is provided at the upper end of the cylinder 10 and a second fastening member 18 is provided at the lower end of the piston rod member 14. The fastening members 16 and 18 are conventional and may, for example, be of the type provided with spherical fastening sockets for connection to spherical fastening balls on the respective constructional members to which the gas spring is to be connected.

Three electrical conductive terminals 20a, 20b and 20c are provided at the upper end of the gas spring, which terminals in the embodiment of FIG. 1 are established by insulated wires. Three further electrically conductive terminals 22a, 22b and 22c are provided at the lower end of the piston rod member 14, and these terminals too may take the form of insulated wires. Each pair of terminals 20a and 22a, 20b and 22b, and 20c and 22c is interconnected by a separate conductive path. The paths may all be permanent, closed paths, but preferably one or more are constructed to be opened at a predetermined position of the piston rod 14 relative to the cylinder or, alternatively, over a portion of the stroke of the piston rod. Thus, the terminals 20c and 22c are electrically interconnected in all positions of the piston rod member 14 relative to the cylinder member 10 by a sliding contact 24 which bears against an electrically conductive sliding path 26 carried by the piston rod 14. The slide contact 24 is connected to terminal 20c, in a manner to be described more fully hereinafter; and the sliding path 26 is connected to terminal 22c.

The terminal 20b, on the other hand, is electrically connected to the terminal 22b only when the piston rod member 14 is in its innermost position with respect to the cylinder member 10. This connection is established by the engagement of a contact element 28 on the cylinder with a contact element provided inside an insulating plastic sleeve 30 mounted on the lower end of the piston rod adjacent the insulating fastening member 18. Also, the terminals 20a and 22a are only interconnected when a contact element 32 electrically connected to terminal 20a engages a contact element inside the plastic sleeve member 30, which contact element is electrically connected to terminal 22a. In accordance with the invention, the electric paths between the terminals 20a, 20b and 20c, on the one hand, and the slide contact 24 and the contact elements 28, 32, on the other hand, are completed through a multi-layer covering member 34 provided on the cylinder member 10.

One embodiment of a suitable multi-layer covering member 34 is shown in FIG. 3. As there shown, the member 34 comprises a strip 36 of insulating sheet material on which are formed two printed conductors 38a and 38b, the third printed conductor not being shown. By "printed conductor" is meant any conductor formed by conventional printed circuit manufacturing techniques, such as, for example, by use of electrically conducting ink, electroplating, or any other way of depositing a conducting material on the surface of an insulating sheet. (See Van Nostrand's Scientific Encyclopedia, published by D. Van Nostrand Company Inc., Princeton, N.J., third edition, January 1958, page 1306.) The printed conductors 38a, 38b are covered by an insulating covering film 40 which in turn perferably bears a layer 42 of pressure sensitive adhesive. Suitably, a removable protective paper 44 is provided on the adhesive layer 42. The totality of layers 36 to 42 defines the multi-layer covering member 34. For mounting this multi-layer covering member 34 on the cylinder member 10, the protective paper 44 is removed and the adhesive layer is pressed against the exterior surface of the cylinder member 10. The printed conductor 38a is then connected to the terminal 20a and the contact element 32, and the printed conductor 38b is connected to the terminal 20b and the contact element 28. The third printed conductor (not shown) is connected to the terminal 20c and the slide contact 24.

The electrical connection between the printed conductors and the structure connecting them to the terminals may be established by pressure contact or by welding or soldering. A preferred way of making such connection is described hereinafter.

FIG. 2 illustrates the multi-layer member 34 in place on the cylinder member 10. Also shown, in addition to the wall of the cylinder member 10 and the multi-layer member 34, is a tubular protection member 46 which surrounds the layer 34 and the cylinder member 10. Suitably, the protection member 46 is under circumferential tension to fix the strip 36 of insulating material in the desired position on the cylinder surface. If so, the adhesive layer 42 may be omitted if desired. A convenient way of mounting the member 46 on the cylinder under tension is to heat-shrink a plastic tube, for example of polyethylene, on the cylinder. The protection member 46 could also be formed of polyvinyl chloride, as disclosed in U.S. Pat. No. 3,919,509.

In FIG. 4, there is shown a further embodiment of a multi-layer member designated by 34'. This multi-layer member 34' comprises a strip 36' of insulating sheet material on which there is provided two printed conductors 38'a and 38'b. Each of said printed conductors 38'a and 38'b comprises three printed conductive lines 38'$a_1$, 38'$a_2$, 38'$a_3$ and 38'$b_1$, 38'$b_2$ and 38'$b_3$. FIG. 5 shows these conductors in more detail. Printed conductive lines 38'$a_1$, 38'$a_2$ and 38'$a_3$ are connected by a printed conductive bridge 48'a, whereas the printed conductive lines 38'$b_1$, 38'$b_2$ and 38'$b_3$ are conductively connected by a printed conductive bridge 48'b. As will be understood, similar conductive bridges (not shown) are provided at the lower end of FIG. 5. The conductive bridges 48'a, 48'b and the non-illustrated conductive bridges at the lower end of FIG. 5 are to be connected, as described below, to the terminals 20a and 20b, on the one hand, and to the contact elements 32 and 28, on the other hand.

As seen in FIG. 4, the strip 36' and the printed conductors 38'a and 38'b are covered by an insulating layer 42' of adhesive material, which is applied to the wall of the cylinder member 10. The adhesive material may be of the type reactivated by heating before being applied to the cylinder member 10, in which case no protective covering paper is necessary. It will be understood, of course, that any suitable adhesive may be used to afix the strips 36 and 36' to the cylinder, and that the pressure-sensitive and heat-sensitive types described herein are merely illustrative.

In the embodiment of FIG. 6, showing the upper part of another embodiment of a gas spring according to this invention, analogous parts are designated by the same reference numbers as were used in FIGS. 1 to 5, but increased by 100.

In FIG. 6, the cylinder member 110 is shown as having an upper terminal section 150 of reduced diameter that is surrounded by an annular member 152 of insulating plastic material. An electrical terminal 154a is embedded in annular member 152 and is provided at its inner end with a contact piece 156. The contact piece 156 is conductively connected to the printed conductor 138a in any suitable way, e.g. by welding or soldering. The adhesive layer 142 and the covering film 140 are removed in the contact area between the contact piece 156 and the printed conductor 138a. It is further to be noted that the outer diameter of the protective tube 146 is not increased by the connection between the plug-shaped terminal 154a and the printed conductor 138a due to the positioning of the terminal 154a and the contact piece 156 in the reduced-diameter axial section 150.

As is further shown in FIG. 6, a closure member 158 is sealingly inserted into the upper end of the cylinder member 110. A conductive ring 160 is inserted between the closure member 158 and the upper terminal face 162 of the cylinder member 110. In this instance, both the closure member 158 and the cylinder member 110 are formed of conductive material. A plug-shaped terminal 154d is connected to the conductive ring 160. A threaded pin 164 is provided on the upper side of the closure member 158 for receipt of an insulating fastening member 116. This arrangement of parts allows a separate electrical path to be completed via the cylinder 110, the closure member 158, the ring 160 and the terminal 154d, while insulating such path from the object to which the spring is mounted.

Figure 7:
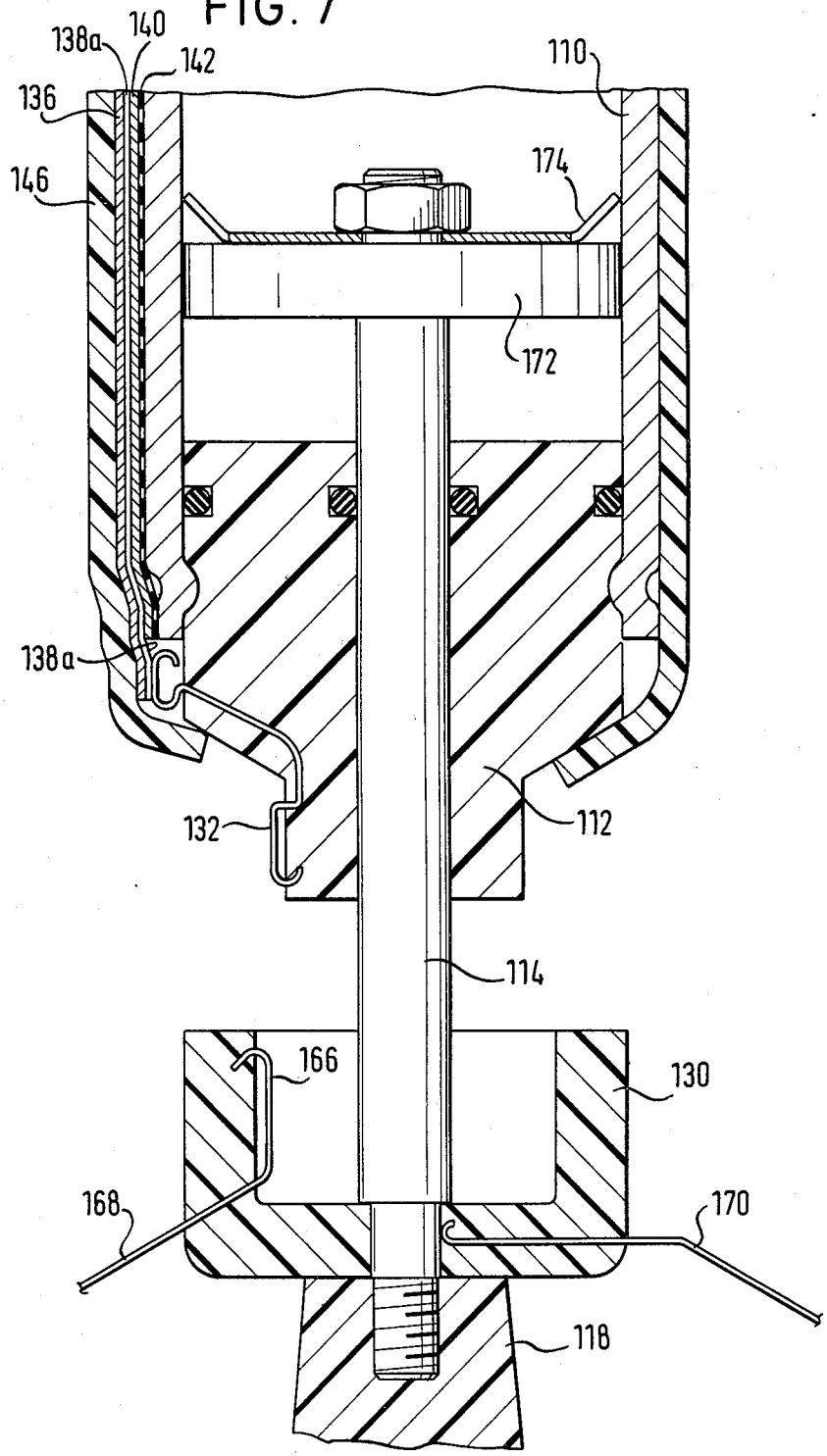
FIG. 7 is a partial longitudinal sectional view of the lower part (as seen in FIG. 1) of the gas spring of FIG. 6.

FIG. 7 depicts the lower end of the gas spring of FIG. 6. Analogous parts are again designated by the same reference numbers as shown in FIGS. 1 to 5, as increased by 100. The sealing and guiding unit 112 is shown in FIG. 7 as being made of plastic, insulating material. The contact element 132 is partly embedded into the guiding and sealing unit 112, with the lower end of the printed conductor 138a connected to the element 132 by soldering or welding. The contact element 132 is shaped at its other end for resilient engagement with a contact element 166 integrally formed with a plug-shaped terminal 168 on the sleeve 130. The sleeve 130 also carries a second terminal 170.

The electric connection between the terminal 154d of FIG. 6 and the terminal 170 of FIG. 7 is established through the electrically conductive cylinder member 110 and the electrically conductive piston rod 114. To that end, the terminal 170 is in electrical contact with the lower end of the piston rod member 114. The piston rod member 114 is provided inside the cylinder 110 with a piston 172 and a star-shaped contact spring 174, which is in sliding engagement with the inner face of the cylinder member 110.

Although the invention has been described and illustrated herein with reference to specific embodiments thereof, it will be understood by those skilled in the art that many modifications and variations of such embodiments may be made without departing from the inventive concepts disclosed. Accordingly, all such modifications and variations are intended to be included within the spirit and scope of the appended claims.

I claim:

1. In a gas spring comprising
   (a) a cylinder member having an axis and being formed with a cavity, said cylinder member being closed at one end thereof and being provided with a sealing and guiding unit at the other end thereof;
   (b) a body of gas under superatmospheric pressure in said cavity;
   (c) a piston rod member axially movable inward and outward of said cavity in sealing engagement with said sealing and guiding unit;
   (d) fastening means attached to respective portions of said members outside said cavity for fastening said members to respective objects;
   (e) at least one first electrically conductive terminal on said cylinder member accessible from outside said cavity;
   (f) at least one second electrically conductive terminal on said piston rod member accessible from outside said cavity; and
   (g) conductive means connecting said terminals during at least a portion of the movement of said piston rod member with respect to said cylinder member, the improvement wherein:
   said conductive means includes a printed circuit-type conductor provided on a flexible strip of insulating sheet material, said strip being applied to the outer exterior face of said cylinder member and shaped in conformity therewith and extending over at least part of the axial length of said cylinder member.

2. The gas spring of claim 1, wherein said strip of insulating sheet material is a substantially rectangular strip, two edges of said strip being substantially parallel to said axis.

3. The gas spring of claim 2, wherein said strip of insulating sheet material extends around at least 360° of the circumference of said cylinder member.

4. The gas spring of claim 1, wherein said printed conductor is covered by an insulating covering layer.

5. The gas spring of claim 4, wherein said insulating covering layer comprises a covering film.

6. The gas spring of claim 1, wherein said strip of insulating sheet material is bonded to the exterior surface of said cylinder member by a layer of adhesive material.

7. The gas spring of claim 6, wherein said printed conductor is covered by an insulated covering layer and said layer of adhesive material is provided on said insulating covering layer.

8. The gas spring of claim 6, wherein said layer of adhesive material also comprises an insulating covering layer for said printed conductor.

9. The gas spring of claim 6, wherein said adhesive material is pressure sensitive adhesive material.

10. The gas spring of claim 9, wherein said layer of pressure sensitive adhesive material is protected by a protective covering sheet before being applied to said cylinder member.

11. The gas spring of claim 1, wherein said strip of insulating sheet material is covered by a tubular protection member surrounding said cylinder member.

12. The gas spring of claim 11, wherein said tubular protection member surrounds said cylinder member under circumferential tension, so as to fix said strip of insulating sheet material in a selected position on the exterior face of said cylinder member.

13. The gas spring of claim 1, wherein said tubular protection member comprises a shrunken plastic tube.

14. The gas spring of claim 1, wherein said printed conductor comprises at least one printed conductive line extending substantially parallel to the axis of said cylinder member.

15. The gas spring of claim 14, wherein said printed conductor comprises a plurality of printed conductive lines extending substantially parallel to each other and being conductively interconnected adjacent the axial ends of said strip of insulating sheet material.

16. The gas spring of claim 15, wherein said plurality of printed conductive lines are interconnected adjacent said ends by a conductive bridge printed on said strip of insulating sheet material.

17. The gas spring of claim 1, wherein said printed conductor is connected to at least one of said first and second electrically conductive terminals by electrically conductive connecting means provided inside a virtual cylindrical face which is in axial alignment with at least one of the exterior face of said cylinder member and the exterior face of the radially outermost layer of material provided on said exterior face of said cylinder member.

18. The gas spring of claim 17, wherein the cylinder member is provided with a terminal section of reduced diameter adjacent at least one of its axial ends, said electrically conductive connecting means being provided axially within said terminal section of reduced diameter.

19. The gas spring of claim 1, wherein said conductive means comprises a first contact element on said cylinder member adjacent said sealing and guiding unit and a second contact element on an axially terminal portion of said piston rod member, said second contact element engaging said first contact element when said piston rod member approaches a terminal position in a direction inward of said cavity.

20. The gas spring of claim 1, wherein said conductive means comprises a slide contact provided on said cylinder member adjacent said sealing and guiding unit and a sliding path of electrically conductive material provided on said piston rod member, said slide contact engaging said sliding path during at least part of the movement of said piston rod member with respect to said cylinder member.

21. The gas spring of claim 1, wherein said cylinder member and said piston rod member are at least partially made of electrically conductive material and wherein at least one further first electrically conductive terminal carried by said cylinder member and at least one further second electrically conductive terminal carried by said piston rod member are electrically interconnected via said cylinder member and said piston rod member during at least part of the movement of said piston rod member with respect to said cylinder member.

* * * * *

UNITED STATES PATENT AND TRADEMARK OFFICE
CERTIFICATE OF CORRECTION

PATENT NO. : 4,317,014
DATED : February 23, 1982
INVENTOR(S) : Rolf Langanke

It is certified that error appears in the above—identified patent and that said Letters Patent is hereby corrected as shown below:

Col. 8, line 34, "claim 1" should read --claim 12--.

Signed and Sealed this

Eighteenth Day of May 1982

[SEAL]

Attest:

GERALD J. MOSSINGHOFF
Attesting Officer    Commissioner of Patents and Trademarks